Aug. 25, 1925.

R. D. EVANS

PHASE BALANCER

Filed Sept. 28, 1923.

WITNESSES:
J. H. English.
O. B. Buchanan.

INVENTOR
Robert D. Evans.
BY
Wesley G. Carr
ATTORNEY

Patented Aug. 25, 1925.

1,551,292

UNITED STATES PATENT OFFICE.

ROBERT D. EVANS, OF WILKINSBURG, PENNSYLVANIA, ASSIGNOR TO WESTINGHOUSE ELECTRIC & MANUFACTURING COMPANY, A CORPORATION OF PENNSYLVANIA.

PHASE BALANCER.

Application filed September 28, 1923. Serial No. 665,368.

*To all whom it may concern:*

Be it known that I, ROBERT D. EVANS, a citizen of the United States, and a resident of Wilkinsburg, in the county of Allegheny and State of Pennsylvania, have invented a new and useful Improvement in Phase Balancers, of which the following is a specification.

My invention relates to polyphase electrical systems, and has particular reference to the problem of balancing either the currents or the voltages thereof.

An object of my invention is to derive, from a polyphase line, a system of polyphase voltages which may be varied in phase and magnitude and which may have either the positive or the negative phase-sequence.

A more specific object of my invention is to provide a polyphase induction regulator and a group of single-phase induction regulators for controlling the phase and the magnitude, respectively, of the booster electromotive force in order to produce balanced voltage or current conditions in an unbalanced polyphase line.

A further object of my invention is to provide automatic regulating apparatus for balancing a polyphase line, as outlined above.

Figure 1:
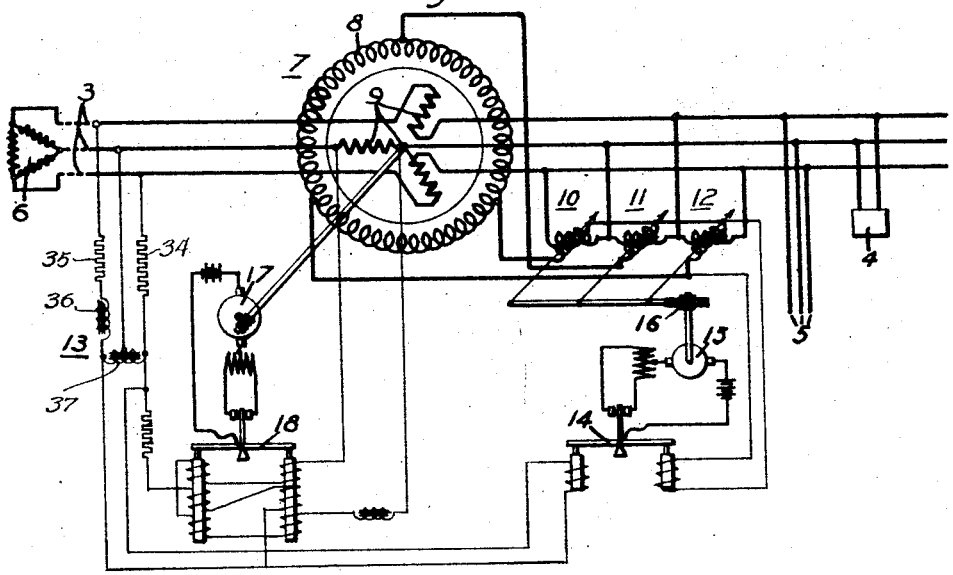
Figure 2:
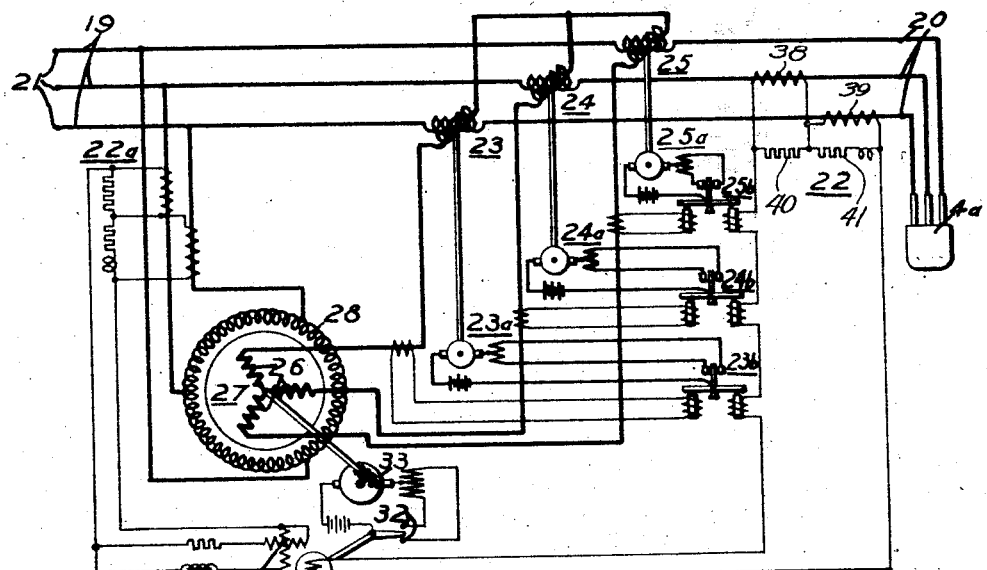

With these and other objects in view, my invention consists in the combinations and arrangements described in the following specification and illustrated in the accompanying drawing, wherein Figure 1 is a diagrammatic view of circuits and apparatus embodying my invention as applied to the problem of securing balanced voltages in an unbalanced line, and Fig. 2 is a similar view illustrating my invention as applied to the problem of obtaining balanced currents from an unbalanced polyphase line.

In the system shown in Fig. 1, a long transmission line 3 is shown supplying an unbalanced load 4 and a polyphase feeder line 5 requiring balanced voltages. Energy is supplied to the distant end of the transmission line from any suitable source located at 6. By reason of the unbalanced currents drawn by the load device 4, the unbalanced line drops in the long transmission line will cause unbalanced voltage conditions to exist at the point of connection of the feeder line 5 on which it is desired to maintain balanced voltages. I provide, therefore, booster means for supplying, to the transmission line, negative-phase-sequence voltages which are equal and opposite to the negative-phase-sequence components of the unbalanced line voltages. To this end, I provide a set of single-phase induction regulators which are utilized to provide a source of polyphase voltages having a variable magnitude and constant phase relationship, and a polyphase induction regulator for securing a variation in the phase of the booster voltage without varying its magnitude.

One of the voltage regulating devices is connected in parallel to the line, while the other is connected in series with the line and is energized from the parallel-connected regulating device.

In the form shown in Fig. 1, a polyphase induction regulator 7 is provided having a polyphase primary winding 8 and a polyphase secondary winding 9, the respective phases of the secondary winding being connected in series with the respective phase conductors of the line. The primary windings 8 are energized, in reverse phase-sequence, from the secondary windings of a bank of single-phase induction regulators 10, 11 and 12 having their primary windings energized from the transmission line on the balanced or load side of the polyphase regulator 7.

In order to control the booster voltage, I provide any suitable indicating device, shown as a static network 13 having the property of producing a voltage which is proportional, in phase and in magnitude, to the negative-phase-sequence component of the line voltages on the unbalanced side of the polyphase induction regulator. The static network 13 comprises a circuit comprising a resistance 34 for drawing a current in phase with one of the phases of the line voltage, and a second circuit comprising a resistance 35 and an inductance 36 having a total impedance equal to the resistance 34 and so proportioned as to draw a current lagging 60° behind another of the phases of the line voltage. The currents in the two circuits are passed through an equalizer coil or autotransformer 37. The phase connections are such that, for balanced positive-phase-sequence line voltages, the currents in the two halves of the equalizer coil 37 are equal and displaced, in the lagging direction, 120°+60°=180° from one another, and no voltage appears across the equalizer coil as a result of such balanced positive-phase-sequence line voltages. For negative-phase-sequence line voltages, the phase that was lagging will be leading, and the equalizer coil currents will be displaced, in the leading direction, 120°—60°=60°. There will thus be a voltage across the equalizer coil proportional to the phase and the magnitude of the negative-phase-sequence line voltage.

The static network per se constitutes the subject-matter of the specification and claims of my copending application Serial No. 358,440, filed Feb. 13, 1920.

A differential relay 14 is provided for balancing the voltage of the network 13 against the voltage of the secondary winding of one of the single-phase induction regulators, as 12, whereby a small regulating motor 15 is energized in the one or the other direction, as may be necessary to maintain the booster voltage equal in magnitude to the negative-phase-sequence component of the unbalanced line voltages. The regulating motor 15 is connected to adjust the three single-phase induction regulators in unison, through any suitable mechanical coupling, indicated at 16.

The relative angular positions of the primary and secondary members of the polyphase induction regulator 7 are controlled by means of a small regulating motor 17 which is energized in the one or the other direction by means of a phase-responsive relay 18, which may be of any suitable or well-known type for indicating the departure, in either direction, of the phase of the booster voltage from the condition of exact phase opposition with respect to the phase of the negative-phase-sequence component of the line voltage.

In operation, the single-phase induction regulators draw such currents from the polyphase line as to generate the necessary negative-phase-sequence booster voltages in the secondary windings 9 of the polyphase induction regulator. Thus, the line voltages are balanced while the currents supplied by the source 6 remain unbalanced.

In Fig. 2 is shown a system for maintaining a balanced current flow notwithstanding the fact that the voltages on one or both sides of the balancing apparatus may be unbalanced. I have indicated a polyphase line 19 carrying currents which are unbalanced at the right-hand terminals 20 of the line, as by reason of an unbalanced furnace load 4a. In order to produce balanced current conditions at the left-hand terminals 21 of the line, I provide shunt-connected apparatus for drawing unbalanced currents of such magnitude and phase relation as to neutralize the negative-phase-sequence components of the unbalanced currents flowing in the line at the right-hand terminals 20.

Any suitable negative-phase-sequence current-indicating device, shown as a static network 22, is employed for deriving currents or voltages which are proportional, in phase and magnitude, to the negative-phase-sequence component of the line currents, at the right-hand end of the line. The static network 22 is similar, in principle, to the voltage-responsive network 13. It comprises two current transformers 38 and 39 which are responsive to two phases of the line current and are closed-circuited, respectively, by the resistance 40 and the resistance and inductance aggregate 41. The instrument terminals of the network are connected to be responsive to the vectorial sum of the voltage drops in the impedances 40 and 41, whereby a resultant voltage is produced only in response to the negative-phase-sequence line currents.

A plurality of single-phase inductance regulators 23, 24 and 25 are connected, in this instance, in series with the line and having their secondary windings connected in star to energize the primary windings 26 of a polyphase induction regulator 27. The settings of the three single-phase regulators are independently controlled by means of three small regulating motors 23a, 24a and 25a, respectively, which are energized, in the one or the other direction, in accordance with the movements of three differential relays 23b, 24b and 25b, which balance the current from the network 22 against the current in the corresponding phase of the primary windings 26, as indicated.

The polyphase induction regulator 27 is provided with secondary windings 28 which are connected, in reverse phase-sequence, across the left-hand end of the polyphase line 19, in order to draw negative-phase-sequence currents which are equal to the negative-phase-sequence current components flowing in the right hand end of the line and which are opposite in phase thereto.

A second network 22a, for measuring the negative-phase-sequence current components, is associated with the terminal conductors of the secondary winding 28 and is utilized to energize the polyphase primary windings 29 of a power-factor meter 30, said meter being shown as having a single-phase secondary winding 31 energized in accordance with the currents flowing in the first-mentioned network 22. The power-factor meter is provided with a pair of contact devices 32, whereby a small regulating motor 33 is energized, in the one or the other direction, to regulate the relative phase positions of the primary and secondary windings of the polyphase induction regulator 27, as may be necessary to maintain the phase of the negative-phase-sequence currents drawn by the secondary windings 28 exactly in phase-opposition to the negative-phase-sequence components of the line currents flowing in the right-hand terminals of the line 19. In this manner, the currents in the line 19 are balanced, while the voltages will, in general, be unbalanced on at least one end of the line.

While I have illustrated and described two different modifications of my invention, it will be obvious that many modifications may be made by those skilled in the art without departing from the spirit of my invention, and that, in all cases, the power may be flowing in either direction. When, for convenience of expression, I speak of power as flowing in a certain direction, I mean to include also the case of reverse energy-flow. I desire, therefore, that the language of the accompanying claims shall be construed in the light of the foregoing statements in so far as may be consistent with the disclosures of the prior art.

I claim as my invention:

1. The combination with a polyphase line, of means for deriving power from said line and generating substantially symmetrical polyphase power of the same frequency as the line, having an electrical quantity of variable voltage ratio but having a constant phase relation, and a second means for interchanging power of the same frequency, having an electrical quantity of variable phase but constant voltage ratio, between said first-mentioned means and said line, one of said means being connected in series with the line and the other being connected in shunt thereto.

2. The combination with a polyphase line having $n$ phases, of means comprising $n$ single-phase induction regulators associated therewith, and means comprising a polyphase induction regulator interchanging power between said single-phase regulators and said line, one of said means being connected in series with the line and the other being connected in shunt thereto.

3. The combination with an unbalanced polyphase line, of means for deriving power from said line and generating substantially symmetrical polyphase power of the same frequency as the line, having an electrical quantity of variable voltage ratio but constant phase relation, and a second means for interchanging negative-phase-sequence power of the same frequency, having an electrical quantity of variable phase but constant voltage ratio, between said first-mentioned means and said line, one of said means being connected in series with the line and the other being connected in shunt thereto.

4. The combination with an unbalanced polyphase line having $n$ phases, of means comprising $n$ single-phase induction regulators associated therewith, and means comprising a polyphase induction regulator interchanging power between said single-phase regulators and said line, one of said means being connected in series with the line and the other being connected in shunt thereto, the phase sequences of said means being reversed, the one with respect to the other, whereby the unbalanced condition of the line may be corrected.

5. The combination with a polyphase line, of means for deriving power from said line and generating substantially symmetrical polyphase power having an electrical quantity of variable voltage ratio but having a constant phase relation, a second means for interchanging power having an electrical quantity of variable phase but constant voltage ratio, between said first-mentioned means and said line, one of said means being connected in series with the line and the other being connected in shunt thereto, electro-responsive means for automatically controlling said first and said second-mentioned means, respectively, in accordance with the magnitude and phase of a quantity in said line.

6. The combination with a polyphase line having $n$ phases, of means comprising $n$ single-phase induction regulators associated therewith, means comprising a polyphase induction regulator interchanging power between said single-phase regulators and said line, one of said means being connected in series with the line and the other being connected in shunt thereto, electro-responsive means for automatically controlling said first and said second-mentioned means, respectively, in accordance with the magnitude and phase of an electrical quantity in said line.

7. The combination with an unbalanced polyphase line, of means for deriving power from said line and generating substantially symmetrical polyphase power having an electrical quantity of variable voltage ratio but constant phase relation, a second means for interchanging negative-phase-sequence power, having an electrical quantity of variable phase but constant voltage ratio, between said first-mentioned means and said line, one of said means being connected in series with the line and the other being connected in shunt thereto, and electro-responsive means for automatically controlling said first and said second-mentioned means, respectively, in accordance with the magnitude and phase of a negative-phase-sequence quantity in said line whereby said quantity may be neutralized.

8. The combination with an unbalanced polyphase line having $n$ phases, of means comprising $n$ single-phase induction regulators associated therewith, and means comprising a polyphase induction regulator interchanging power between said single-phase regulators and said line, one of said means being connected in series with the line and the other being connected in shunt thereto, and electroresponsive means for automatically controlling said first and said second-mentioned means, respectively, in accordance with the magnitude and phase of a negative-phase-sequence quantity in said line whereby said quantity may be neutralized.

9. The combination with a three-phase line, of a three-phase induction regulator having primary windings and secondary windings, said secondary windings being connected in series with said line, and three single-phase induction regulators having their primary windings connected in parallel to the respective phases of said line and having their secondary windings connected to the primary windings of said three-phase regulator.

10. The combination with a three-phase line, of a three-phase induction regulator having primary windings and secondary windings, said secondary windings being connected in series with said line, electro-responsive means for maintaining the phase of the secondary electromotive forces of said three-phase regulator substantially opposite to the phase of a line-voltage component, three single-phase induction regulators having their primary windings connected in parallel to the respective phases of said line and having their secondary windings connected to the primary windings of said three-phase regulator, and electro-responsive means for simultaneously regulating all of said single-phase regulators in accordance with the magnitude of electrical conditions in the line.

11. The combination with a three-phase line having unbalanced voltages, of a three-phase induction regulator having primary windings and secondary windings, said secondary windings being connected in series with said line for substantially balancing the voltage thereof, and three single-phase induction regulators having their primary windings connected in parallel to the respective phases of said line on the balanced side of said three-phase regulator and having their secondary windings connected, in reverse phase-sequence, to the primary windings of said three-phase regulator.

12. The combination with a three-phase line having unbalanced voltages, of a three-phase induction regulator having primary windings and secondary windings, said secondary windings being connected in series with said line for substantially balancing the voltage thereof, electro-responsive means for maintaining the phase of the secondary electromotive forces of said three-phase regulator substantially opposite to the corresponding phase of the corresponding negative-phase-sequence line-voltage component, three single-phase induction regulators having their primary windings connected in parallel to the respective phases of said line on the balanced side of said three-phase regulator and having their secondary windings connected, in reverse phase-sequence, to the primary windings of said three-phase regulator, and electro-responsive means for simultaneously regulating all of said single-phase regulators in accordance with the magnitude of the corresponding negative-phase-sequence electrical conditions in the line.

In testimony whereof, I have hereunto subscribed my name this 22nd day of September 1923.

ROBERT D. EVANS.